D. HEALEY.
Wagon Brake.
No. 88,293.  Patented March 30, 1869.
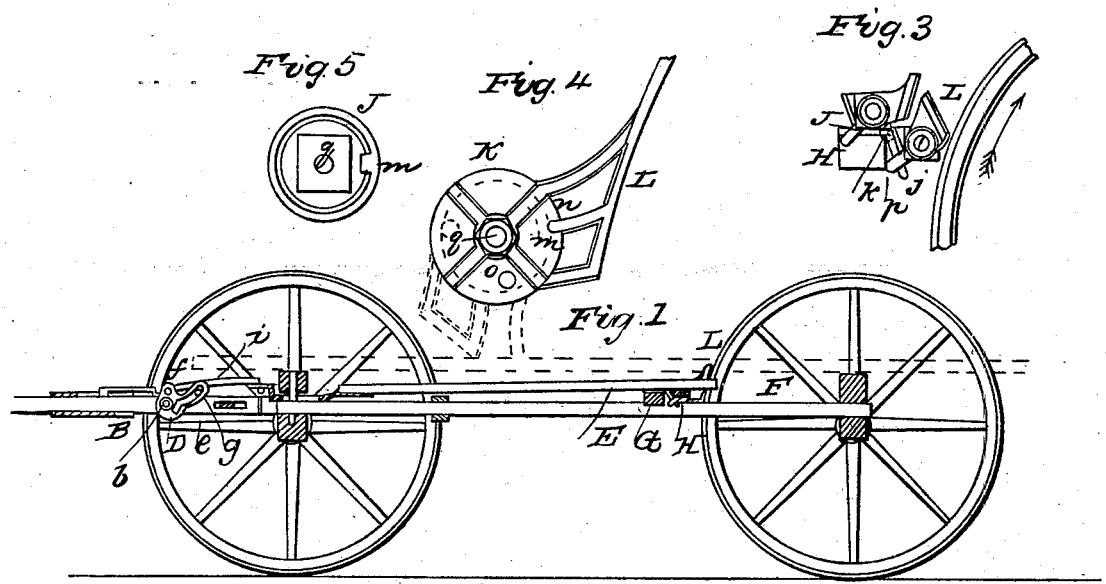
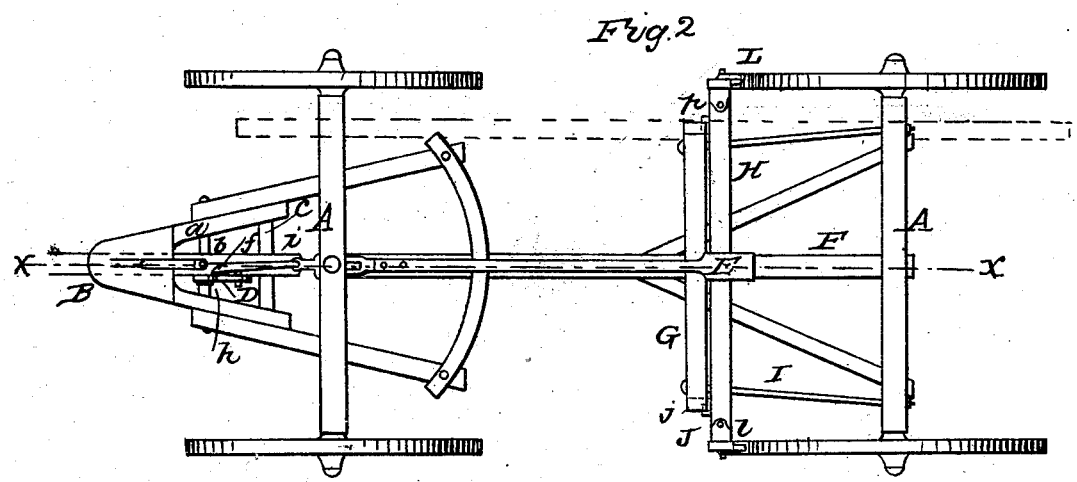
WITNESSES
L. Nailer
P. T. Dodge
INVENTOR
D. Healey
by Dodge & Munn
his attys.

D. HEALY, OF DANSVILLE, NEW YORK.

Letters Patent No. 88,293, dated March 30, 1869.

IMPROVEMENT IN WAGON-BRAKES.

The Schedule referred to in these Letters Patent and making part of the same

*To all whom it may concern:*

Be it known that I, D. HEALY, of Dansville, in the county of Steuben, and State of New York, have invented certain new and useful Improvements in Self-Acting Wagon-Brakes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to wagon-brakes that are self-acting, and consists in the novel construction and arrangement of certain mechanical devices, in connection with the wagon, by which I produce a brake that promptly acts automatically to retard the motion of the wagon in descending inclines.

In the drawings—

Figure 1 is a longitudinal vertical section on the line $x$–$x$ of fig. 2;

Figure 2 is a top plan view; and

Figures 3, 4, and 5 are views of parts detached.

I construct my brake so that it may be applied to any wagon, A, having its principal parts made and arranged in the usual manner, and so as to be operated by the pressing forward of the wagon in descending inclines.

To accomplish this, I slot the rear end of the pole B, so that it may move longitudinally between its braces $a$, and on the tongue-bolt $b$ and cross-piece $c$, as shown in figs. 1 and 2.

The front ends of the pole-braces $a$, I firmly connect with a metallic plate, $d$, or in any other suitable manner, providing it with a slot, through which the bolt passes that holds the whiffle-trees to the pole, and allows them to move with it, as shown in the same figures.

On the tongue-bolt $b$, and so as to move loosely about it, I place an arm, D, having a slot, $e$, and a projection, $f$, formed and shaped as clearly shown in fig. 1.

This slotted arm D, I arrange on the bolt $b$, so as to be next to the pole B, on which there is a pin, $g$, which enters the slot in the arm, as shown in figs. 1 and 2.

The arm may be held in position by a sleeve, or washer, $h$, as shown in fig. 2, or by any equivalent device.

The projection $f$, of the slotted arm D, is connected loosely with a rod, $i$, to a longitudinal bar, or reach, E, just forward of the front bolster, as shown in figs. 1 and 2, the reach having a slot in it, for the king-bolt of the wagon to pass through, and to permit an easy longitudinal movement.

To the reach F of the wagon, and a little forward of the hind wheels, I fasten strongly a cross-piece, G, and brace it, by bolts I, to the hind bolster.

On the ends of this cross-piece, I place securely, so as to cover their upper and rear sides, and to extend a little beyond them, metallic plates $j$.

The projection of these plates forms a guide-lip, which on the rear side I construct to incline toward the hind wheels, for the purpose hereinafter explained, and as shown in fig. 1, and very clearly in fig. 3.

In the angle formed by the top and rear sides of the plates $j$, I place a friction-roller, $k$, as shown in red in fig. 3.

To the longitudinal bar E, I attach rigidly a cross-bar, H, as shown in fig. 2, and fasten on its ends metallic heads J, as shown in the same figure, by means of a screw, or bolt passing through their necks into the cross-bar.

The periphery of the head J projects outwardly a little, and has on its inner side a stop, $m$, as clearly shown in fig. 5.

Over the head J, I place a metallic cap, K, which also has its periphery extended, so as to cover the head J, and is provided with a stop, $n$, as shown in dotted lines in fig. 4.

The cap K, I cast, or connect in any suitable manner with a brake-shoe, L, which is curved sufficiently to fit the contour of the wheel, and also provide it with a movable pin, O, for a purpose hereinafter explained, and connect it loosely to the cross-bar H, by means of a screw-bolt, $q$, or other suitable device.

In the cross bar H, I place strong pins $p$, with their outer ends bent, so as to hook under and bear against the under side of the projecting lips of the plates $j$, as clearly shown in fig. 2.

The operation of my device thus constructed will be readily understood.

Whenever the wagon is moving down an incline, and presses forward on the team, they, in turn, hold back, and, in doing so, carry the pole B back, which causes the pin $g$, attached to it, to move in the slotted arm D, and turn it on the bolt $b$.

As the slotted arm D turns, it carries its projection $f$ backward, which at the same time, by the connecting-rod $i$, forces the bar E back.

In moving back, the cross-bar H is guided by the pins $p$, which follow the direction of the lips of the plates $j$, and brings the shoes L fairly on the faces of the hind wheels, as shown in figs. 1 and 2.

When this is done, it will be seen that the effort of the wheels to turn in the direction of the red arrows, forward, only increases the closeness of contact between the shoe and the wheel, as the effect is to carry the shoe down, and, as it is carried down, the bar H becomes wedged tighter and tighter in its position.

When the wagon ceases to press forward, for any reason, and begins to drag, then it causes the slotted arm D to turn again, and with it the entire apparatus is moved, the cross-bar H being carried up on the cross-piece G, with the shoes L, as shown in fig. 3, its movement being facilitated by the friction-rollers $k$.

Should the wagon be backed for any reason, the shoe-brakes L will be carried up and released, as also shown in fig. 3.

The forward movement of the shoe I limit, by the stops m and n, which are arranged to come in contact, as shown in fig. 4, and also limit its backward movement by the movable pin O.

Whenever it is desired, for any reason, to release the brake entirely, so that it cannot be brought into action, the pin O can be taken out, and the shoe L be thrown back, as shown by the red lines in fig. 4.

My devices may be applied with equal ease and advantage to that class of wagons which have no central reach, but have their front and hind bolsters connected by side reaches, as shown in red lines in figs. 1 and 2, it being only necessary to connect the plates j to the under sides of these reaches, as clearly shown in red in fig. 1.

It is obvious that the slotted arm D, with its connections, may be so arranged as to operate the brake under the reach F as well as over it, and that, instead of having the slot e, it may be provided with a groove on its side, for the pin g to move in.

In this way, I am able to produce a brake that always acts promptly whenever the wagon presses forward in descending an incline, and which is not liable to get clogged by the mud from the wheels, against which it is brought to bear, for the reason that the construction and arrangement of the cap K over the head J, is such as to keep the mud from getting under the cap, and, in this way, interfering with the movement of the shoe.

Having thus described my invention,

What I claim, is—

1. A brake, constructed and arranged to work on an incline, j, in such a manner that the friction of the wheel thereon, in its forward movement, will hug it closer and wedge it in position, substantially as herein described.

2. In combination, the rocking slotted arm D, operated by the sliding tongue B, with the sliding brake, when constructed and arranged to operate substantially as herein described and for the purpose set forth.

3. The shoe L, with the cap K, in combination with the head J, when constructed and arranged to operate substantially as herein described and for the purpose set forth.

D. HEALY.

Witnesses:
H. B. MUNN,
P. T. DODGE.